United States Patent [19]

Knowles

[11] 3,990,937

[45] Nov. 9, 1976

[54] LAMINATED BEAM PRESS

[75] Inventor: Robert A. Knowles, Tacoma, Wash.

[73] Assignee: Weyerhaeuser Company, Tacoma, Wash.

[22] Filed: Dec. 8, 1975

[21] Appl. No.: 638,575

[52] U.S. Cl. .............................. 156/558; 100/215; 144/242 R; 144/245 A; 144/317; 156/563; 156/578; 156/580

[51] Int. Cl.[2] .................. B32B 31/00; B30B 15/30; B27D 1/00

[58] Field of Search .......... 156/557, 558, 559, 563, 156/578, 580; 100/215; 144/242 R, 245 R, 245 A, 317, 315 R, 309 D

[56] References Cited

UNITED STATES PATENTS

| | | | |
|---|---|---|---|
| 2,490,819 | 12/1949 | Lambert et al. | 156/558 |
| 2,588,874 | 3/1952 | Quick | 156/558 |
| 3,036,947 | 5/1962 | Marra | 156/580 |
| 3,943,025 | 3/1976 | Russell | 156/580 |

*Primary Examiner*—Douglas J. Drummond

[57] ABSTRACT

In a laminated beam press apparatus a predetermined number of wooden members are conveyed through an adhesive spreader and then are individually transferred laterally into a re-orienting transfer conveyor. The re-orienting transfer conveyor is then moved vertically downward to deposit the collected wooden pieces in a press section. The press platens are closed in order to cure the beam. After curing, the press is open and the re-orienting transfer conveyor then moves vertically upward through the press section, thereby removing the laminated beam.

8 Claims, 3 Drawing Figures

LAMINATED BEAM PRESS

BACKGROUND OF THE INVENTION

This invention relates generally to an apparatus for manufacturing laminated beams from individual boards of preselected dimensions. The invention relates more particularly to an apparatus for essentially automatically gluing, orienting and pressing a peselected number of boards together into a laminated beam product.

Laminated beams have been available in the marketplace for many years and are generally comprised of a plurality of rectangular elongated wooden members bonded together with a suitable adhesive. Some laminated beams are formed in elaborate shapes for particular end uses while others are formed into simple rectangular beams.

As the supply of larger logs continues to decrease over time the demand for laminated products will continue to increase. In the past, simple beams were comprised of solid sawn wood; however, as noted with the diminishing supply of larger logs it becomes increasingly difficult to supply the needs for larger wooden members in solid sawn form. Consequently, it is becoming increasingly necessary to develop methods and apparatus for laminating smaller wooden members together to provide larger structural members having suitable strength, appearance, and cost characteristics as compared to solid sawn wood products.

In general, a typical laminated beam forming process comprises the following series of steps: selecting the individual elongated wooden members for size and quality, spreading the appropriate adhesive on the appropriate surfaces of the individual wooden members, orienting the correct number of individual wooden members in the proper position for bringing the individual members together into beam form, and finally adding pressure and/or heat to the thusly formed beamed member in order to cure the lines of adhesive.

In the past, laminated beams were usually formed essentially by manual means and typically this method tends to be time-consuming, costly, and generally inefficient. It, therefore, is desirable to consider ways of mechanising the laminated beam forming process.

Accordingly, from the foregoing, one object of the present invention is to provide a mechanical apparatus to carry out the laminated beam forming process.

Another object of the present invention is to substantially automate the beam forming process in order to reduce the amount of manual labor required.

Yet a further object of the present invention is to provide an essentially continuous operation by having a plurality of press openings.

These and other objects of the invention will become apparent upon reading the following specification in conjunction with the attached drawing.

Summary of the Invention

Briefly stated, the invention is practiced in one form by conveying a predetermined number of individual elongated wooden members through an adhesive spreader and onto an even ending lateral transfer conveyor. The lateral transfer conveyor then places each of the elongated members into individual holding stations within a vertically movable re-orienting transfer conveyor. After a predetermined number of individual elongated wooden members are re-oriented by the re-orienting transfer conveyor, it is moved vertically downward through a generally horizontal press opening where a plurality of generally horizontal arm members hold the individual wooden members until closure of the press platens. With each individual member spaced laterally and in a vertical plane, the press is closed bringing the members together into a composite beam form. The adhesive lines are then cured for the proper amount of time. After curing, the press platens are opened and the vertically movable re-orienting transfer conveyor is then moved vertically upward picking the finished beam out of the press section and conveying it onto an outfeed conveyor. An identical press station together with a re-orienting transfer conveyor can be spaced laterally from a first press section in order to increase production.

DESCRIPTION OF THE PREFERRED EMBODIMENT

Figure 1:
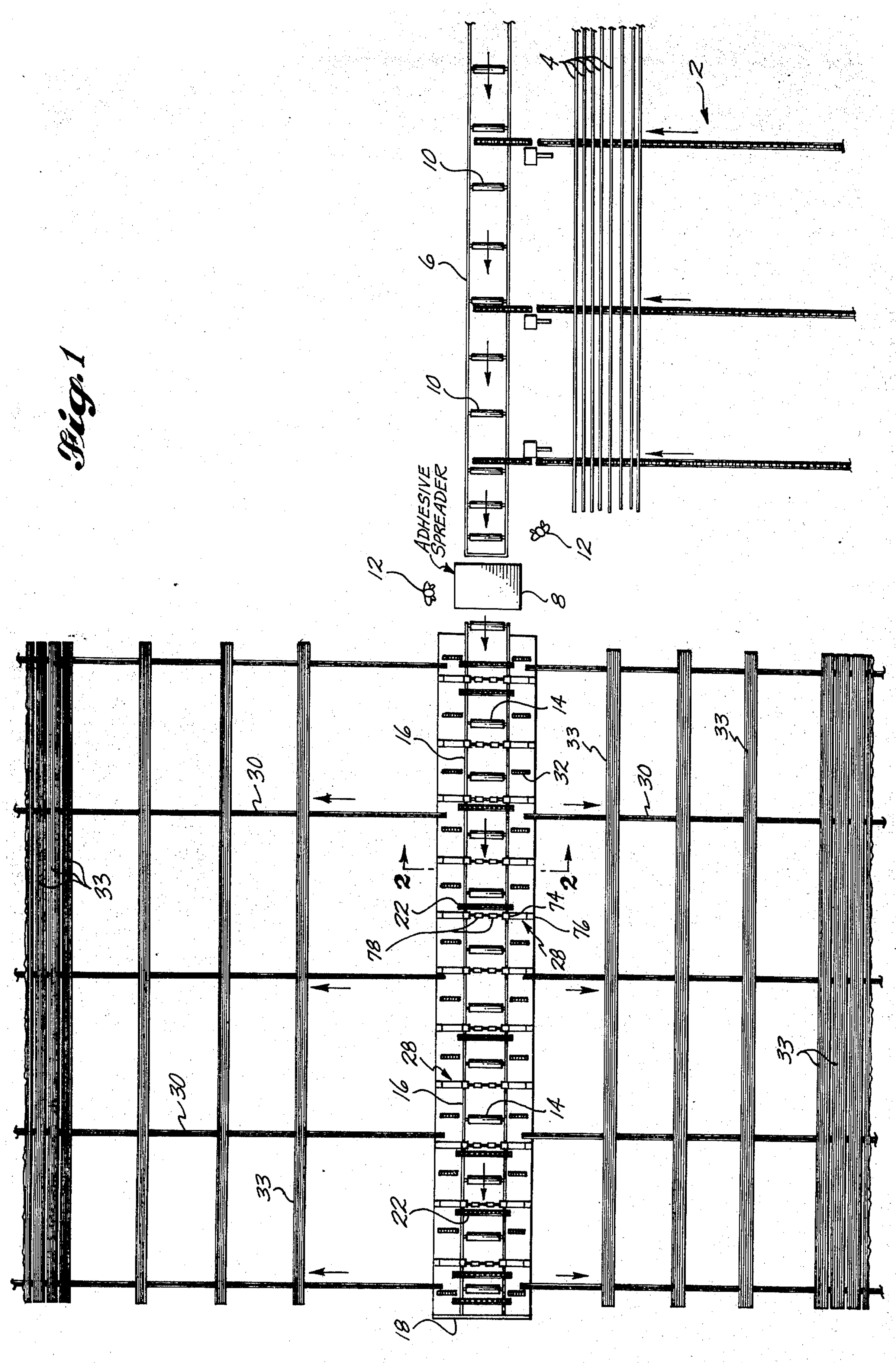
FIG. 1 is an overall plan view showing the general layout of the laminated beam forming apparatus.

Referring first to FIG. 1, a general description will be given of the overall layout of the laminated beam forming apparatus comprising the present invention. An infeed conveyor generally indicated at 2 transports a plurality of individual elongated wooden member; each indicated as 4, in the transverse or lateral direction from an upstream position toward the longitudinally extending infeed conveyor 6 for passage through the adhesive spreader 8. Each wooden member 4 may be preselected for the appropriate dimensions and quality. For example, the wooden members could be typical 2×10 pieces of lumber of a certain length and grade. Each piece is, of course, preselected to yield the desired properties in the final laminated beam.

The infeed conveyor 2 is of any suitable construction and has the ability to start and stop on command in order to sequentially deliver individual wooden members to longitudinal infeed conveyor 6. Infeed conveyor 6 can be of the type having individual powered rollers 10. Infeed conveyor 6 is also of the type which is able to start and stop on command. As the individual wooden members 4 are conveyed onto infeed conveyor 6, they are in a horizontal orientation, that is, their width dimension is in a horizontal plane. Upon command, for example, as controlled by one of two operators indicated at 12 an individual member 4 is conveyed through adhesive spreader 8 in order to receive a glue line on its top surface along its entire length.

As each individual wooden member 4 passes through adhesive spreader 8 traveling in the longitudinal direction, it will be conveyed forward atop powered rollers 14 mounted within frame 16. The plurality of powered rollers 14 are in the same horizontal plane as conveyor 6 and form a conveying surface for conveying each wooden member 4 until it is halted by way of a vertical stop member 18.

Figure 2:
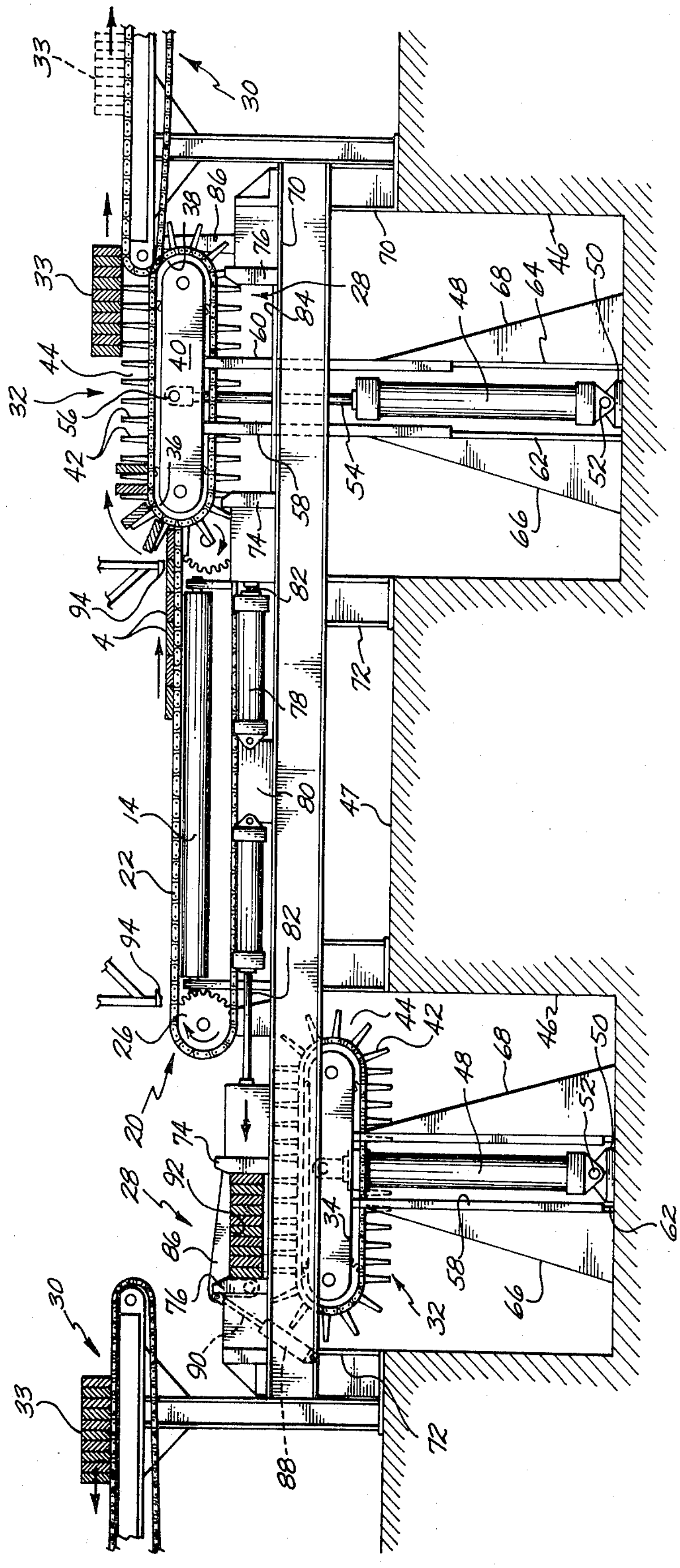
FIG. 2 is a cross sectional view taken along line 2—2 of FIG. 1 and shows the details of the conveying and pressing apparatus during a certain period of operation.
Figure 3:
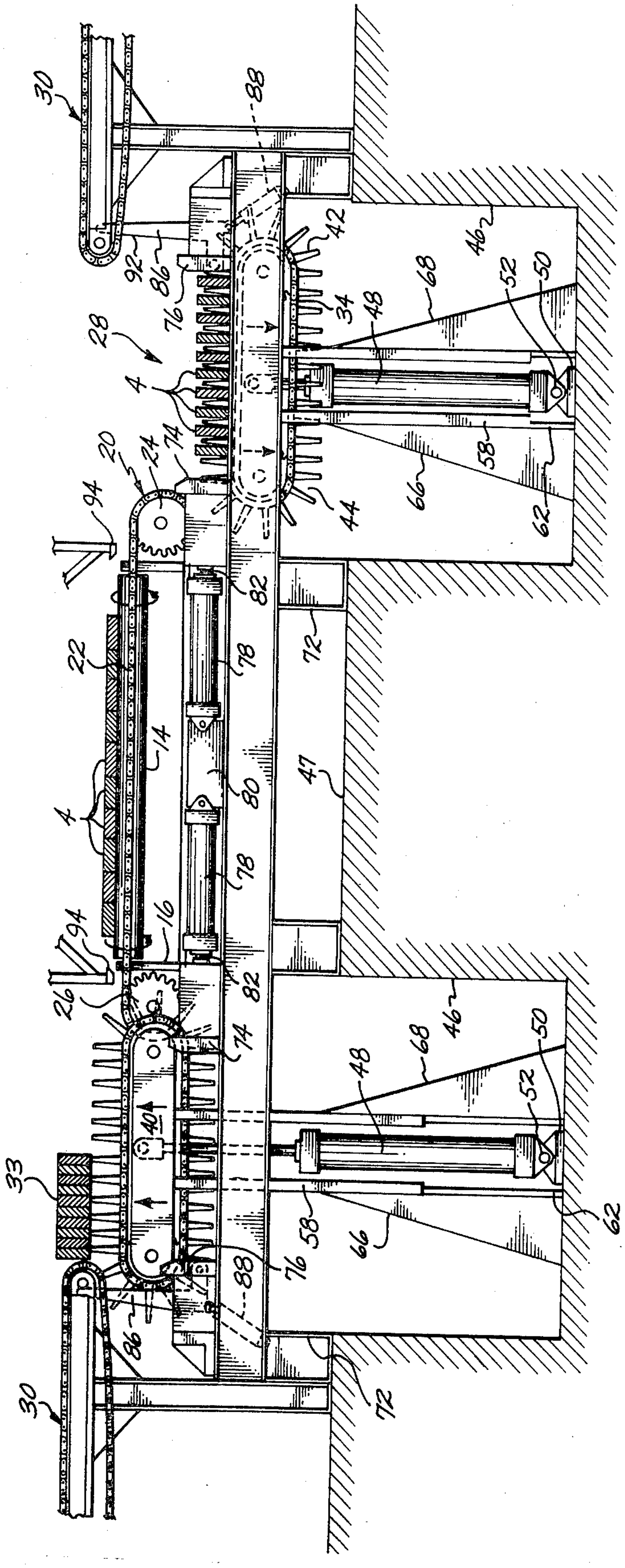
FIG. 3 is a view similar to FIG. 2 showing a different phase of operation.

As more clealy depicted in FIG. 3, a plurality of individual wooden members 4 are conveyed through adhesive spreader 8 such that they are generally adjacent one another in an edgewise orientation but still in a generally horizontal plane. In view of the function of stop member 18 the downstream ends of each wooden member 4 terminate at a common plane. The frame 16 is of the type that is vertically adjustable in the sense that it may be raised and lowered on command in order to transfer an accumulated plurality of wooden members 4 to a transfer conveyer generally indicated at 20. Transfer conveyor 20 is comprised of a plurality of longitudinally spaced endless chains 22 trained about pairs of laterally spaced sprockets 24, 26 (see FIGS. 2 and 3). At least one of the sprockets of each pair is powered in order to turn the respective chain 22 in either direction. The transfer conveyor 20 will accept the accumulated individual wooden members 4 as the powered rollers 14 are lowered to their bottom position. Once the individual wooden member 4 are atop transfer conveyor 20 they are then ready to be conveyed into the overall first press which is comprised of a plurality of individual press sections each indicated at 28. After individual wooden members 4 have been laminated together to form a beam, they are removed from the press and transferred laterally over the outfeed conveyor 30 downstream to await further processing. A finished beam is indicated as 33.

Turning now more specifically to FIGS. 2 and 3, additional details particularly of a press section 28 will be described. As shown, there are first and second presses laterally spaced from one another along each longitudinal edge of transfer conveyor 20. For present purposes, one press will be described since the other is substantially the same except of the opposite hand. Of course, it will be recognized by those skilled in the art that one reason for having two spaced presses is to increase productivity in view of certain time constraints one of which is cure time in the press.

Laterally spaced, yet substantially adjacent, the right hand edge of transfer conveyor 20 (right hand as depicted in FIG. 2) is the vertically movable re-orienting transfer conveyor 32. As previously noted the broad function of transfer conveyor 32 is to separate individual wooden members 4 and re-orient them such that they are each laterally spaced and in a vertical plane and then to transfer them with the same orientation into the press opening for subsequent pressing and curing. A plurality of such longitudinally spaced transfer conveyors 32 operate together to carry out the general function in such a way as to mechanically avoid interference with other elements of the system. Each transfer conveyor 32 is comprised of an endless chain 34 trained about a pair of laterally spaced sprockets 36, 38. The laterally spaced sprockets 36, 38 are in turn mounted within a frame 40 in order to provide structural integrity and to create a horizontal conveying plane for transfer conveyor 32. At least one of the sprockets is powered in order to cause the endless chain 34 to move in at least the direction toward outfeed conveyor 30. Extending outwardly from endless chain 34 are a plurality of pickup fingers 42 with the fingers being spaced apart laterally a distance which is slightly greater than the thickness of any individual wooden member 4. Each adjacent pair of pickup fingers 42 forms an individual holding station 44. The outward dimension of pickup fingers 42 is generally slightly less than the width of a wooden member 4 in order to ensure smooth operation as will be apparent later.

The mechanism to cause the vertical movement of reorienting transfer conveyor 32 is contained substantially within a longitudinally extending depression 46 in the floor 47. Within depression 46 and spaced longitudinally therealong are a plurality of generally vertically extending actuating cylinders 48. One end of each actuating cylinder 48 is attached to ground through a mounting plate 50 and pin connection means 52 while verticaly extendable ram 54 of each cylinder 48 is connected at its uppermost end to the frame 40 generally at its lateral midpoint through the pinned connection means 56.

Extending downwardly from the lower lateral edge of frame 40 are a pair of laterally spaced guide elements 58, 60. The guide elements 58, 60 are adapted to slide along the mating verticaly disposed run elements 62, 64. Serving to support run elements 62, 64 in their vertical orientation are a pair of opposed supporting frame elements 66, 68.

Positioned substantially in a horizontal plane at a vertical point below the horizontal plane of transfer conveyor 20 and generally corresponding in lateral position and dimensions with the re-orienting transfer conveyor 32 is a press section 28. A plurality of separate press sections 28 are spaced longitudinally the length of transfer conveyor 20. Supporting each press section 28 is a horizontally extending beam 70. Beams 70, in addition to a plurality of other supporting beams in a vertical orientation indicated collectively as 72, serve to structurally support each element of the overall system in its proper position with respect to other cooperating elements. A press section 28 is comprised of a pair of laterally opposed platens 74, 76. The platen 74 of each pair is movable in the lateral direction towards and away from the other as provided by the platen actuating cylinder 78. Actuating cylinder 78 is attached to a tail block 80 which in turn is fixed to beam 70 substantially at its midpoint below transfer conveyor 20. The outer end of ram 82 is fixed to the movable platen 74. As is apparent, the lateral distance between a fixed platen 76 and movable platen 74 is variable. When the platens of press section 28 are in their full open position as depicted in the right hand press section of FIG. 2, each platen will be at a lateral position corresponding generally with the lateral position of the axes of the laterally spaced sprockets 36, 38. Providing the horizontal supporting surface for the individual wooden members 4 when they are in press section 28 are laterally extending holding elements 84. The re-orienting transfer conveyor 32 will pass through press section 28 on its downward movement depositing therein its accumulation of individual wooden members 4 atop the holding elements 84. Of course it will be recognized that after each re-orienting transfer conveyor 32 deposits its accumulation of individual members 4 into the press sections 28, the movable platens 74 will then be directed laterally to the closed position as is depicted in the left hand press section of FIG. 2. In the right hand press section of FIG. 3, the re-orienting transfer conveyors 32 are being carried downwardly by actuating cylinders 48 and are just transfering the individual wooden members 4 to the press section. The operating sequence will be described in more detail later.

The re-orienting transfer conveyors 32 also serve to remove a pressed beam 33 after the adhesive has suitably cured and to transfer it to outfeed conveyor 30. This function is accomplished by moving the transfer conveyors 32 in the upward direction through the press sections 28 after each movable platen has been reopened such that the uppermost edges of a plurality of pickup fingers 42 will remove a pressed beam and carry it upwardly to a position directly adjacent the longitudinal edge of outfeed conveyor 30. As the re-orienting transfer conveyors 32 begin to recharge their individual holding stations 44, the finished beam will be conveyed laterally onto outfeed conveyor 30 where it can then be conveyed further in a lateral direction for any additional processing. As depicted in FIG. 2, when the re-orienting transfer conveyors 32 are in their uppermost positions, the top edges of pickup fingers 42 will form a horizontal plane that is substantially in line with the horizontal plane formed by outfeed conveyor 30.

A pivotal arm member 86 is positioned at each press section 28 and fixed to platen 76. The pivotal arm member 86 is actuated by an actuating cylinder 88 having the outer end of its ram 90 connected to the arm member 86. Upon command the actuating cylinder 88 extends its ram 90 so as to pivot the arm member 86 through an angle whereby the inner laterally extending edge 92 of arm member 86 will then function to hold and constrain the individual wooden members 4 in their proper relationship with one another during pressing.

Operation of the Invention

Assuming first that all press sections are empty and that a first beam is to be formed, one of the operators will command that a first individual wooden member 4 be conveyed through adhesive spreader 8. The first wooden member of a beam will pass directly through the adhesive spreader without receiving an adhesive surface on its top face. The top face of the first wooden member will be that face which abuts the fixed platen once the press section is closed and therefore no adhesive will be needed. Each of the succeeding wooden members 4 that pass through the adhesive spreader will have an adhesive surface applied to their top face and will be conveyed to abut the stop member 18 to form an accumulation of ten individual wooden members abutting in an edgewise manner as best seen in FIG. 3. The particular number of individual wooden members making up a laminated beam may vary and the fact that the figures show ten such members is to be taken by way of example only and is not intended to limit the scope of the invention.

After the preselected number of individual wooden members has been conveyed to a position atop the powered rollers 14 and are abutting stop member 18 the frame 16 will be actuated to move vertically downward below the horizontal plane of the transfer conveyor 20. With the frame 16 remaining in its lower position, the re-orienting transfer conveyors 32 are raised to their uppermost vertical positions. The transfer conveyor 20 is then powered in an indexing fashion such that one individual member 4 is conveyed laterally into the waiting holding stations 44 on the re-orienting transfer conveyors 32. The wooden member 4 will be picked from the transfer conveyor 20 and indexed around by the pickup fingers 42. The re-orienting transfer conveyors 32 and transfer conveyor 20 are synchronized such that each wooden member 4 will be positioned within succeeding longitudinally aligned holding stations 44. This operation is best seen by referring to the right hand re-orienting transfer conveyor of FIG. 2. A plurality of longitudinally spaced shoe member 94 are positioned directly above the incoming individual wooden members 4 at the infeed edge of re-orienting conveyors 32. The function of shoe members 94 is to confine the incoming wooden members to a horizontal plane of travel.

When the appropriate number of wooden members have been accumulated by the re-orienting transfer conveyors 32, they are then withdrawn vertically to a position past the press respective sections 28 leaving the individual wooden members atop the holding elements 84. This phase of the operation is best seen by referring to the right hand press section FIG. 3 where the individual wooden members are just being transferred to holding elements 84. Each re-orienting transfer conveyor 32 continues in a downward direction such that the top edges of pickup fingers 42 are below the holding elements 84. The movable platens 74 are then moved laterally toward the fixed platens 76 by their actuating cylinders in order to close the overall press. At substantially the same time, cylinders 88 will be actuated to move arm members 86 to a position over the top edges of wooden members 4. When each of the movable platens 74 is in its closed position, a certain time period will then pass while the respective lines of adhesive cure.

After the proper amount of cure time, the press sections 28 are opened by causing the movable platens 74 to retract to their open positions. Each vertically movable transfer conveyor 32 is then moved upwardly such that the top edges of pickup fingers 42 will contact the bottom edge of the pressed beam. The transfer conveyors 32 will continue in the upward direction to a position where the pressed beam is now adjacent the outfeed conveyor 30. With the re-orienting transfer conveyors 32 in this position, they are then ready to accept another charge of individual wooden members 4 at the same time they convey the pressed beam onto outfeed conveyor 30. The sequency is then ready to repeat in order to form another beam.

The opposite hand press section, that is those on the left hand side of the laminated beam forming apparatus, operate in precisely the same manner as those on the right. Of course the directions of travel for the transfer conveyors are simply reversed in order to charge the individual wooden members 4 into the left hand re-orienting transfer conveyors 32.

While a detailed description of the principal embodiment has been given, it is understood that many changes and modifications may be made in the above described laminated beam forming apparatus without departing from the spirit of the invention. All such modifications are intended to be included within the scope of the appended claims.

What is claimed is:

1. A laminated beam press apparatus comprising:

means to selectively spread adhesive on the top of a plurality of individual elongated members, in horizontal orientation;

a vertically movable re-orienting transfer conveyor, comprising:

means to pick a predetermined number of said individual members from the generally horizontal orientation and transfer them to a substantially vertical side-by-side orientation, and means to move the members in their vertical orientation downwardly to a position where they rest atop a substantially horizontally supporting surface;

a press section having at least two laterally opposed platens extending longitudinally in close proximity to the supporting surface and movable laterally relative to each other in order to bring the members into a pressed relationship; and means to open the platens after pressing and remove the laminated beam from the press section.

2. The apparatus as in claim 1 in which the means to pick and transfer the members from a horizontal to a vertical orientation is comprised of a plurality of pickup fingers extending outwardly from the transfer conveyor and which are indexed around so as to pick individual elongated members off of one side of a lateral transfer conveyor and carry them to a vertical orientation within the re-orienting transfer conveyor.

3. The apparatus as in claim 1 in which the means to move the elongated members downwardly is comprised of an actuating cylinder attached to the re-orienting transfer conveyor adapted to move the transfer coveyor to a vertical position below the supporting surface and then back to a position for picking more members from the horizontal orientation and transferring them to a vertical orientation.

4. The apparatus as in claim 1 in which the press section is comprised of pairs of opposed platens extending longitudinally the length of the supporting surface which each pair having an actuating cylinder to open and close the pair.

5. The apparatus as in claim 2 in which the means to remove the beam from the press section is comprised of the top edges of the pickup fingers as the re-orienting transfer conveyor moves vertically upward through the press section.

6. The apparatus as in claim 2 further including an outfeed conveyor that is generally in the same horizontal plane as that along the top edges of the pickup fingers and adjacent thereto when the re-orienting transfer conveyor is in its uppermost position arranged and adapted to accept a laminated beam as the pickup fingers are caused to move laterally.

7. The apparatus as in claim 1 further including a plurality of pivotal arm members spaced longitudinally along the press section arranged and adapted to be pivoted in order to overlie the members within the press section so as to hold and constrain the members during pressing.

8. The apparatus as in claim 2 further including a second laminated beam press apparatus positioned opposite the other side of the lateral transfer conveyor.

* * * * *

UNITED STATES PATENT OFFICE
CERTIFICATE OF CORRECTION

PATENT NO. : 3,990,937

DATED : November 9, 1976

INVENTOR(S) : ROBERT A. KNOWLES

It is certified that error appears in the above-identified patent and that said Letters Patent are hereby corrected as shown below:

In column 3, line 15, "member" should read --members--;

in column 4, line 13, "verticaly" should read --vertically--;

in column 4, line 56, "section" should read --sections--;

in column 6, line 9, "section FIG. 3" should read --section of FIG. 3--; and in column 6, line 65, "horizontally" should read --horizontal--.

Signed and Sealed this

Twenty-ninth Day of March 1977

[SEAL]

*Attest:*

RUTH C. MASON
*Attesting Officer*

C. MARSHALL DANN
*Commissioner of Patents and Trademarks*